United States Patent
Ko et al.

(10) Patent No.: US 8,363,633 B2
(45) Date of Patent: Jan. 29, 2013

(54) METHOD OF TRANSMITTING DATA IN MULTIPLE ANTENNA SYSTEM

(75) Inventors: Hyun Soo Ko, Anyang-si (KR); Jin Young Chun, Anyang-si (KR); Moon Il Lee, Anyang-si (KR); Bin Chul Ihm, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 358 days.

(21) Appl. No.: 12/808,328

(22) PCT Filed: Dec. 16, 2008

(86) PCT No.: PCT/KR2008/007443
§ 371 (c)(1),
(2), (4) Date: Jun. 15, 2010

(87) PCT Pub. No.: WO2009/078651
PCT Pub. Date: Jun. 25, 2009

(65) Prior Publication Data
US 2011/0149942 A1    Jun. 23, 2011

Related U.S. Application Data

(60) Provisional application No. 61/014,074, filed on Dec. 16, 2007.

(30) Foreign Application Priority Data

Apr. 29, 2008    (KR) .................. 10-2008-0040067

(51) Int. Cl.
*H04J 1/00*    (2006.01)

(52) U.S. Cl. .................. 370/343; 370/334; 370/480
(58) Field of Classification Search .................. None
See application file for complete search history.

(56) References Cited

U.S. PATENT DOCUMENTS

| 2005/0243939 | A1  | 11/2005 | Jung et al. |         |
|--------------|-----|---------|-------------|---------|
| 2007/0159959 | A1* | 7/2007  | Song et al. | 370/208 |
| 2007/0217539 | A1* | 9/2007  | Ihm et al.  | 375/267 |
| 2008/0165734 | A1* | 7/2008  | Hart et al. | 370/330 |

FOREIGN PATENT DOCUMENTS

| KR | 1999-0072821 A   | 9/1999 |
| KR | 2002-046547 A    | 6/2002 |
| KR | 2006-0045107 A   | 5/2006 |
| WO | WO 2004/077730 A2| 9/2004 |

* cited by examiner

*Primary Examiner* — Jianye Wu
(74) *Attorney, Agent, or Firm* — McKenna Long & Aldridge LLP

(57) ABSTRACT

A method of transmitting data in a multiple antenna system includes transmitting first data through a first pilot pattern zone in which pilots are arranged in a specific pilot pattern in a permutation zone having at least one tile comprising a plurality of orthogonal frequency division multiplexing (OFDM) symbols and a plurality of subcarriers, and transmitting second data through a second pilot pattern zone in which pilots are arranged in another pilot pattern different from the pilot pattern of the first pilot pattern zone in the permutation zone. Accordingly, a plurality of pilot patterns can be simultaneously used in one permutation zone, and thus waste of radio resources caused by the use of unnecessary pilots can be reduced by adaptively assigning pilots according to various channel environments and performances of user equipments.

13 Claims, 12 Drawing Sheets

○ Data subcarrier
⊘ Pilot subcarrier for antenna 1

- ○ Data subcarrier
- ⊘ Pilot subcarrier for antenna 1
- ⊘ Pilot subcarrier for antenna 2

- ○ Data subcarrier
- ⊘ Pilot subcarrier for antenna 1
- ⊘ Pilot subcarrier for antenna 2
- ⊘ Pilot subcarrier for antenna 3
- ⊖ Pilot subcarrier for antenna 4

METHOD OF TRANSMITTING DATA IN MULTIPLE ANTENNA SYSTEM

This application is a 35 U.S.C. §371 National Stage entry of International Application No. PCT/KR2008/007443, filed on Dec. 16, 2008, and claims priority to U.S. Provisional Application No. 61/014,074, filed Dec. 16, 2007 and Korean Application No. 10-2008-0040067, filed on Apr. 29, 2008 each of which is hereby incorporated by reference in its entirety as if fully set forth herein.

TECHNICAL FIELD

The present invention relates to wireless communications, and more particularly, to a method of transmitting data in a multiple antenna system.

BACKGROUND ART

The institute of electrical and electronics engineers (IEEE) 802.16 standard provides a technique and protocol for supporting broadband wireless access. The standardization had been conducted since 1999 until the IEEE 802.16-2001 was approved in 2001. The IEEE 802.16-2001 is based on a physical layer of a single carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 was completed in 2005 in a format of 'corrigendum'.

Recently, to maximize performance and communication capability of wireless communication systems, attention is paid to a multiple input multiple output (MIMO) system. Being evolved from the conventional technique in which a single transmit (Tx) antenna and a single receive (Rx) antenna are used, a MIMO technique uses multiple Tx antennas and multiple Rx antennas in order to improve efficiency of data transmission and reception. The MIMO system is also referred to as a multiple antenna system. In the MIMO technique, instead of receiving one whole message through a single antenna path, data segments are received through a plurality of antennas and are then assembled into one piece of data. As a result, a data transfer rate can be improved in a specific range, or a system range can increase with respect to a specific data rate.

The MIMO technique includes transmit diversity, spatial multiplexing, and beamforming. The transmit diversity is a technique in which the multiple Tx antennas transmit the same data so that transmission reliability increases. The spatial multiplexing is a technique in which the multiple Tx antennas simultaneously transmit different data so that data can be transmitted at a high speed without increasing a system bandwidth. The beamforming is used to add a weight factor to multiple antennas according to a channel condition so as to increase a signal to interference plus noise ratio (SINR) of a signal. The weight factor can be expressed by a weight vector or a weight matrix which is also referred to as a precoding vector or a precoding matrix.

The spatial multiplexing is classified into single-user spatial multiplexing and multi-user spatial multiplexing. The single-user spatial multiplexing is also referred to as a single user MIMO (SU-MIMO). The multi-user spatial multiplexing is also referred to as a spatial division multiple access (SDMA) or a multi user MIMO (MU-MIMO). A capacity of a MIMO channel increases in proportion to the number of antennas. The MIMO channel can be decomposed into independent channels. If the number of Tx antennas is Nt, and the number of Rx antennas is Nr, then the number of independent channels is Ni where $Ni \leq \min\{Nt, Nr\}$. Each independent channel can be referred to as a spatial layer. A rank represents the number of non-zero eigen-values of the MIMO channel and can be defined as the number of spatial streams that can be multiplexed. As a method for transmitting a weight, there is a method for transmitting a weight vector by using a pilot.

Meanwhile, to support various and effective data transfer methods in the wireless communication system, data is transmitted by being assigned to a logical resource region and then by being mapped to a physical resource region. This process is called permutation. Various permutation rules are defined in the IEEE 802.16 standard. A permutation zone is a region where the same permutation rule is used. The same pilot structure is used in the same permutation zone. In the MIMO system, each user may require a different rank. When a selected pilot structure is suitable for a user who requires a high rank in the same permutation zone, users who require a low rank unnecessarily use a large number of pilots. That is, limited radio resources are wasted due to unnecessary use of pilots.

Therefore, there is a need for a method capable of effectively transmitting data by adaptively assigning pilots according to a rank of a user in a permutation zone.

DISCLOSURE OF INVENTION

Technical Problem

The present invention provides a method for effectively transmitting data by adaptively assigning pilots according to a rank of a user.

Technical Solution

In an aspect, a method of transmitting data in a multiple antenna system is provided. The method includes: transmitting first data through a first pilot pattern zone in which pilots are arranged in a specific pilot pattern in a permutation zone having at least one tile comprising a plurality of orthogonal frequency division multiplexing (OFDM) symbols and a plurality of subcarriers; and transmitting second data through a second pilot pattern zone in which pilots are arranged in another pilot pattern different from the pilot pattern of the first pilot pattern zone in the permutation zone.

In another aspect, a method of transmitting data in a multiple antenna system is provided. The method includes: transmitting data assigned with a pilot pattern depending on a first rank; receiving a retransmission request for the data; and transmitting retransmission data for the data after receiving the retransmission request, wherein a second rank modified from the first rank is applied to the retransmission data and a second pilot pattern depending on the second rank is assigned to the retransmission data.

Advantageous Effects

Since a plurality of pilot patterns can be simultaneously used in one permutation zone in the present invention, waste of radio resources caused by the use of unnecessary pilots can be reduced by adaptively assigning pilots according to various channel environments and performances of user equipments.

MODE FOR THE INVENTION

Figure 1:
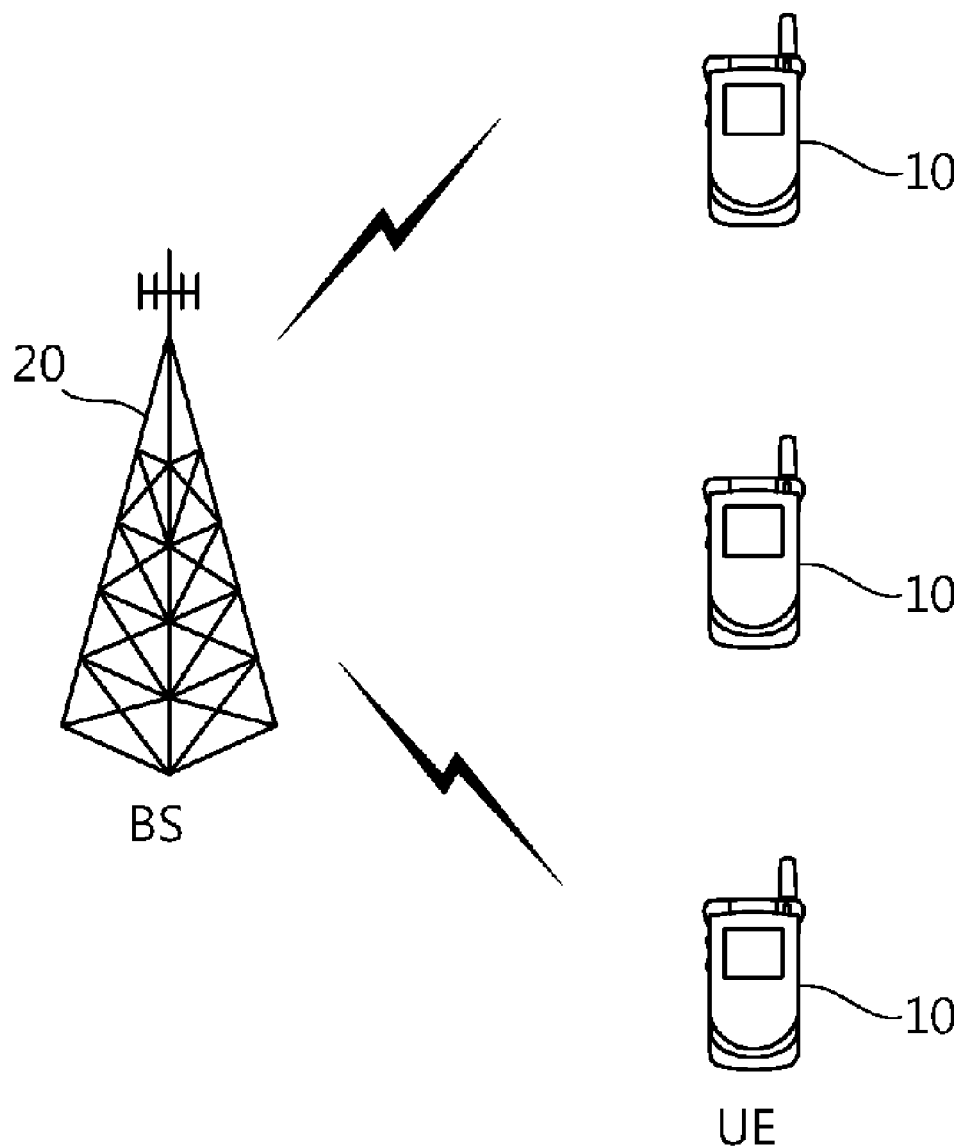
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one mobile station (MS) 10 and a base station (BS) 20. The MS 10 may be fixed or mobile, and may be referred to as another terminology, such as a user equipment (UE), a user terminal (UT), a subscriber station (SS), a wireless device, etc. The BS 20 is generally a fixed station that communicates with the MS 10 and may be referred to as another terminology, such as a node-B, a base transceiver system (BTS), an access point, etc. There are one or more cells within the coverage of the BS 20.

A downlink (DL) represents a communication link from the BS 20 to the MS 10, and an uplink (UL) represents a communication link from the MS 10 to the BS 20. In DL, a transmitter may be a part of the BS 20, and a receiver may be a part of the UE 10. In UL, the transmitter may be a part of the UE 10, and the receiver may be a part of the BS 20.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). The transmitter transmits data by performing IFFT. The receiver restores original data by performing FFT on a received signal. The transmitter uses IFFT to combine the plurality of subcarriers, and the receiver uses FFT to split the plurality of subcarriers.

The wireless communication system may be a multiple antenna system. The multiple antenna system may be a multiple input multiple output (MIMO) system. The multiple antenna system may be a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

The multiple antenna system can use a scheme using multiple antennas. In case of a rank 1, the scheme may be space-time coding (STC) (e.g., space frequency block code (SFBC) and space time block code (STBC)), cyclic delay diversity (CDD), frequency switched transmit diversity (FSTD), time switched transmit diversity (TSTD), etc. In case of a rank 2 or higher ranks, the scheme may be spatial multiplexing (SM), generalized cyclic delay diversity (GCDD), selective virtual antenna permutation (S-VAP), etc. The SFBC is a scheme for effectively applying selectivity in a space domain and a frequency domain to ensure both a diversity gain and a multi-user scheduling gain in a corresponding dimension. The STBC is a scheme for applying selectivity in the space domain and a time domain. The FSTD is a scheme in which signals transmitted to multiple antennas are divided in the time domain, and the TSTD is a scheme in which the signals transmitted to the multiple antennas are divided in the frequency domain. The SM is a scheme for transmitting different data to each antenna to improve a transfer rate. The GCDD is a scheme for applying selective in the time domain and the frequency domain. The S-VAP is a scheme using a single precoding matrix, and includes a multi-codeword (MCW) S-VAP for mixing multi-codewords to antennas in spatial diversity or spatial multiplexing and a single codeword (SCW) S-VAP using a single codeword.

Figure 2:
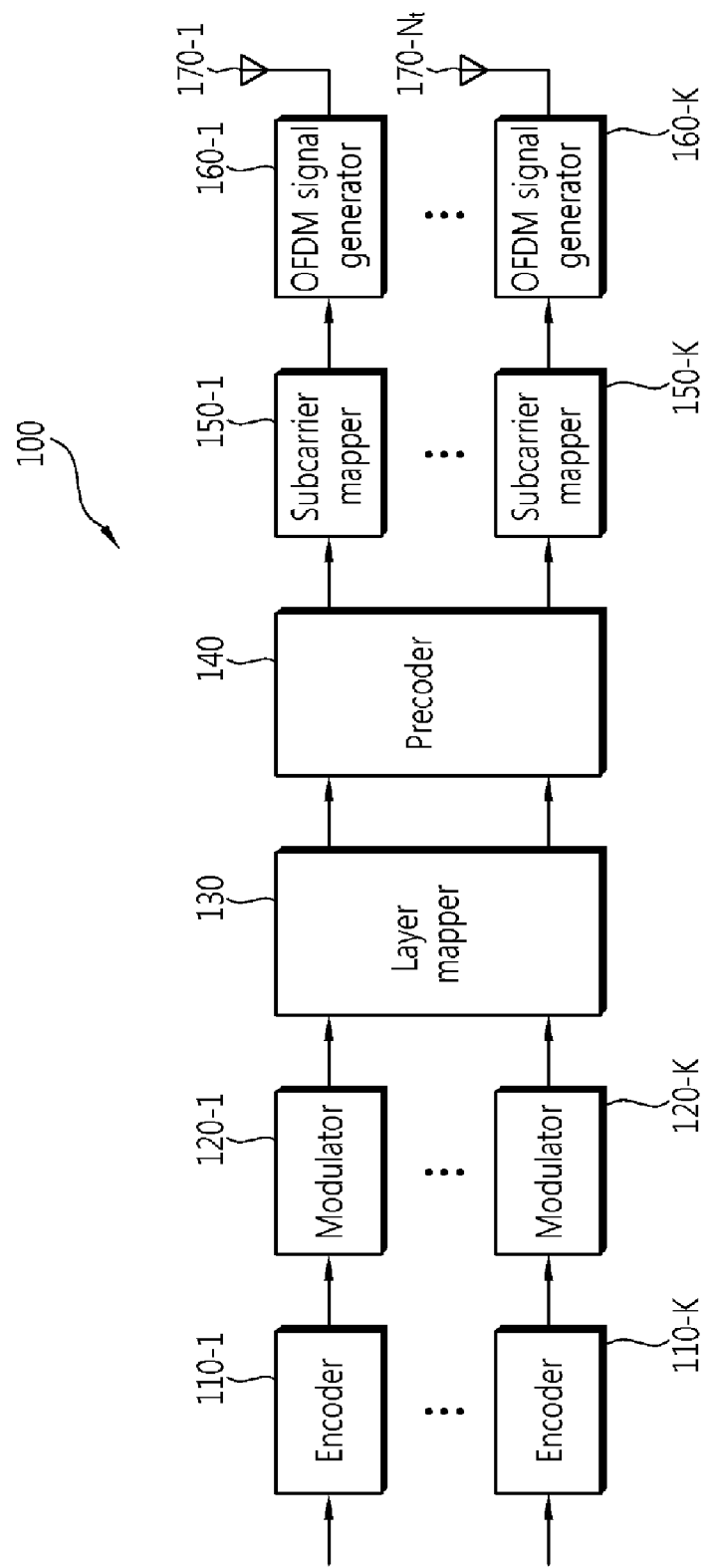
FIG. 2 is a block diagram showing a structure of a transmitter according to an embodiment of the present invention.

FIG. 2 is a block diagram showing a structure of a transmitter according to an embodiment of the present invention.

Referring to FIG. 2, a transmitter 100 includes encoders 110-1, . . . ,110-K, modulators 120-1, . . . ,120-K, a layer mapper 130, a precoder 140, subcarrier mappers 150-1, . . . ,150-K, and OFDM signal generators 160-1, . . . ,160-K. The transmitter 100 also includes Nt (Nt≧1) Tx antennas 170-1, . . . ,170-Nt.

The encoders 110-1, . . . ,110-K generate coded data by encoding input data according to a predetermined coding scheme. The modulators 120-1, . . . ,120-K arrange the coded data into symbols representing locations on a signal constellation. A modulation scheme is not limited to a specific modulation scheme, and may be an m-phase shift keying (m-PSK) or an m-quadrature amplitude modulation (m-QAM). Examples of the m-PSK include binary PSK (BPSK), quadrature PSK (QPSK), and 8-PSK. Examples of the m-QAM include 16-QAM, 64-QAM, and 256-QAM.

The layer mapper 130 defines a layer of an input symbol so that each antenna can distribute a specific symbol to a path of each antenna. The layer is defined as an information path input to the precoder 140. The information path located ahead of the precoder 140 can be called a virtual antenna (or layer).

The precoder 140 processes an input symbol by using a MIMO scheme according to the multiple Tx antennas 170-1, . . . ,170-Nt. For example, the precoder 140 can use codebook-based precoding. The precoder 140 distributes an antenna-specific symbol to the subcarrier mappers 150-1, . . . ,150-K for a path of a specific antenna. Each information path transmitted to one antenna by the precoder 140 by the use of one subcarrier mapper is called a stream. The antenna may be a physical antenna.

The subcarrier mappers 150-1, . . . ,150-K allocate input symbols to suitable subcarriers and then multiplex the resultant symbols according to a user. The OFDM signal generators 160-1, . . . ,160-K modulate input symbols according to an OFDM scheme and then outputs OFDM symbols. The OFDM signal generators 160-1, . . . ,160-K can perform inverse fast Fourier transform (IFFT) on input symbols. A cyclic prefix (CP) may be inserted into a time-domain symbol which has undergone the IFFT. The OFDM symbols are transmitted through the respective Tx antennas 170-1, . . . ,170-Nt.

In the MIMO system, the transmitter 100 can operate in two modes. One is an SCW mode and the other is an MCW mode. In the SCW mode, Tx signals transmitted through a MIMO channel have the same data rate. In the MCW mode, data transmitted through the MIMO channel is independently encoded, and thus the Tx signals can have different data rates. The MCW mode operates when a rank is greater than 1.

Figure 3:
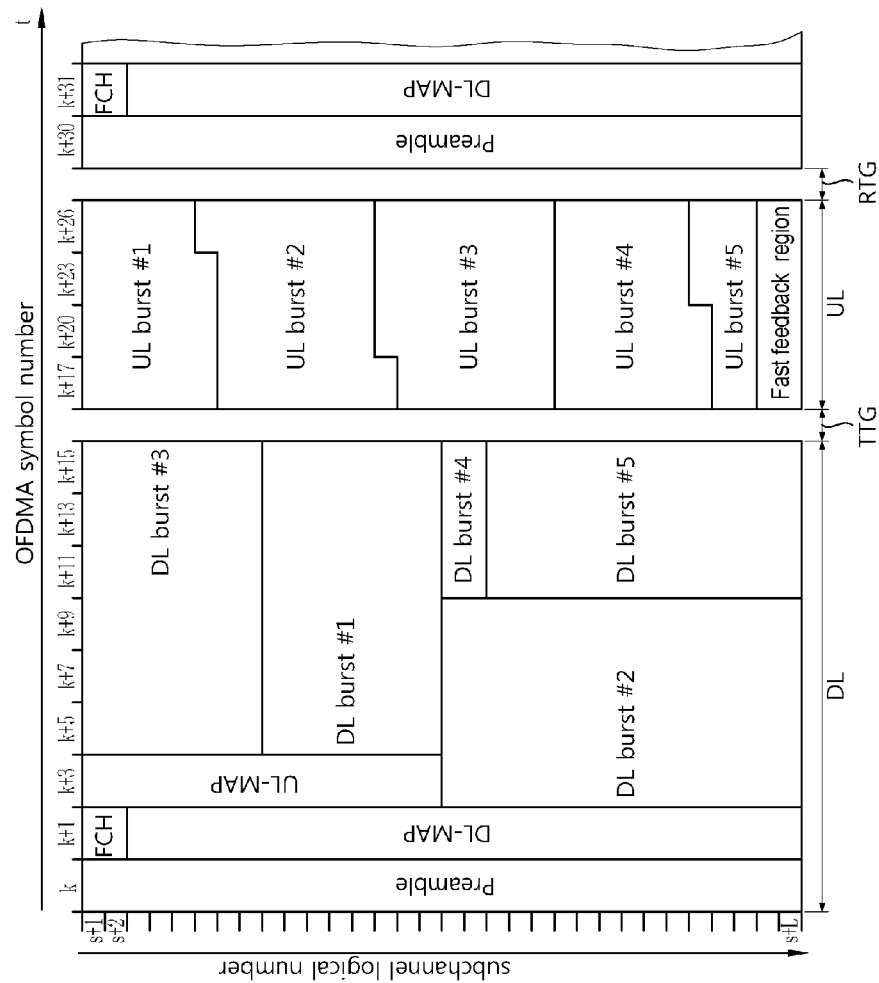
FIG. 3 shows an example of a frame structure.

FIG. 3 shows an example of a frame structure. A frame is a data sequence used according to a physical specification in a fixed time duration. This may be found in section 8.4.4.2 of "Part 16: Air Interface for Fixed Broadband Wireless Access Systems" in the institute of electrical and electronics engineers (IEEE) standard 802.16-2004 (hereinafter, Document 1).

Referring to FIG. 3, the frame includes a downlink (DL) frame and an uplink (UL) frame. In a time division duplexing (TDD) scheme, UL and DL transmissions are achieved at different time points but share the same frequency band. The DL frame temporally precedes the UL frame. The DL frame sequentially includes a preamble, a frame control header (FCH), a DL-MAP, a UL-MAP, and a burst region. Guard times are provided to identify the UL frame and the DL frame and are inserted to a middle portion (between the DL frame and the UL frame) and a last portion (next to the UL frame) of the frame. A transmit/receive transition gap (TTG) is a gap between a downlink burst and a subsequent uplink burst. A receive/transmit transition gap (RTG) is a gap between an uplink burst and a subsequent downlink burst.

A preamble is used between a BS and a UE for initial synchronization, cell search, and frequency-offset and channel estimation. The FCH includes information on a length of a DL-MAP message and a coding scheme of the DL-MAP.

The DL-MAP is a region for transmitting the DL-MAP message. The DL-MAP message defines access to a DL channel. The DL-MAP message includes a configuration change count of a downlink channel descriptor (DCD) and a BS identifier (ID). The DCD describes a downlink burst profile applied to a current MAP. The downlink burst profile indicates characteristics of a DL physical channel. The DCD is periodically transmitted by the BS by using a DCD message.

The UL-MAP is a region for transmitting a UL-MAP message. The UL-MAP message defines access to a UL channel. The UL-MAP message includes a configuration change count of an uplink channel descriptor (UCD) and also includes an effective start time of uplink allocation defined by the UL-MAP. The UCD describes an uplink burst profile. The uplink burst profile indicates characteristics of a UL physical channel and is periodically transmitted by the BS by using a UCD message.

Hereinafter, a slot is a minimum unit of possible data allocation, and is defined with a time and a subchannel. The number of subchannels depends on a fast Fourier transform (FFT) size and time-frequency mapping. Each subchannel includes a plurality of subcarriers. The number of subcarriers included in each subchannel differs according to a permutation rule. Permutation denotes mapping from a logical subchannel to a physical subcarrier. In full usage of subchannels (FUSC), each subchannel includes 48 subcarriers. In partial usage of subchannels (PUSC), each subchannel includes 24 or 16 subcarriers. A segment denotes at least one subchannel set.

In order for data to be mapped to physical subcarriers in a physical layer, two steps are generally performed on the data. In a first step, the data is mapped to at least one data slot on at least one logical subchannel. In a second step, each logical subchannel is mapped to a physical subcarrier. This is called permutation. Examples of the permutation rule employed in the Document 1 above include FUSC, PUSC, optional-FUSC (O-FUSC), optional-PUSC (O-PUSC), adaptive modulation and coding (AMC), etc. A set of OFDM symbols using the same permutation rule is referred to as a permutation zone. One frame includes at least one permutation zone.

The FUSC and the O-FUSC are used only in downlink transmission. The FUSC consists of one segment including all subchannel groups. Each subchannel is mapped to a physical subcarrier distributed over the entire physical channel. This mapping varies for each OFDM symbol. A slot consists of one subchannel on one OFDM symbol. The O-FUSC uses a pilot assignment scheme different from that used in the FUSC.

The PUSC is used both in downlink transmission and uplink transmission. In downlink, each physical channel is divided into clusters, each of which includes 14 contiguous subcarriers on two OFDM symbols. The physical channel is mapped in six groups. In each group, pilots are assigned in fixed positions to each cluster. In uplink, subcarriers are divided into tiles, each of which includes four contiguous physical subcarriers on three OFDM symbols. The subchannel includes six tiles. Pilots are assigned to the corners of each tile. The O-PUSC is used only in uplink transmission. Each tile includes three contiguous physical subcarriers on three OFDM symbols. Pilots are assigned to the center of each tile. The pilot can be also referred to as a reference signal.

Figure 4:
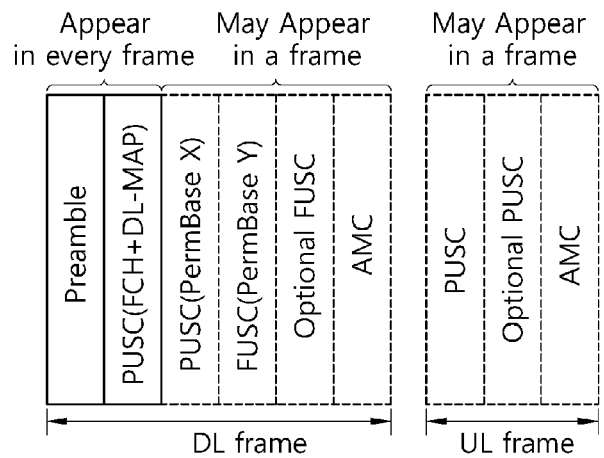
FIG. 4 shows an example of a frame including a plurality of permutations.

FIG. 4 shows an example of a frame including a plurality of permutations. The frame may be a physical frame. This may be found in section 8.4.4.2 of the IEEE standard 802.16-2004 (i.e., Document 1).

Referring to FIG. 4, in a DL frame, a preamble, an FCH, and a DL-MAP must appear in every frame. A PUSC permutation is applied to the FCH and the DL-MAP. A PUSC permutation, an FUSC permutation, an optional FUSC permutation, and an AMC permutation may appear in the DL frame. The permutations appeared in the DL frame can be specified in the DL-MAP. A PUSC permutation, an optional PUSC, and an AMC permutation may appear in a UL frame. The permutations appeared in the UL frame can be specified in a UL-MAP. Types of permutations used in the UL frame and the DL frame are not limited thereto, and thus can be variously modified. Data or control information in frames can be accurately obtained by using the preamble, the FCH, the DL-MAP, or the like included in each frame.

A permutation zone is a region where the same permutation rule is used. A plurality of permutation zones can be divided in a time domain. The same antenna scheme is used in each permutation zone divided in the time domain. Accordingly, a pilot structure for a designated antenna scheme is applied in the same pattern along the entire frequency band within a minimum range of a permutation zone. For example, a preamble and a PUSC permutation can be transmitted using an SISO scheme, and an AMC permutation can be transmitted using a MIMO scheme. In this case, different pilot structures are applied according to antenna schemes. In a preamble and a PUSC permutation zone, a pilot structure for one Tx antenna can be used. When transmission is performed using two Tx antennas in an AMC permutation zone, a pilot structure capable of distinguishing the two Tx antennas is used. Table 1 below shows an example of an information element (IE) for a permutation zone.

TABLE 1

| Syntax | Size (bit) | Notes |
|---|---|---|
| STC_DL_Zone_IE() { | — | — |
| Extended DIUC | 4 | STC/DL_Zone_SWITCH = 0x01 |
| Length | 4 | Length = 0x04 |
| OFDMA symbol offset | 8 | Denotes the start of the zone (counting from the frame preamble and starting from 0) |
| Permutation | 2 | 0b00: PUSC permutation, 0b01: FUSC permutation, 0b10: Optional FUSC permutation, 0b11: Adjacent subcarrier permutation |
| Use All SC indicator | 1 | 0: Do not use all subchannels, 1: Use all sub-channels |
| STC | 2 | 0b00: No STC, 0b01: STC using 2/3 antennas, 0b10: STC using 4 antennas, 0b11: FHDC using 2 antennas, |
| Matrix Indicator | 2 | STC matrix (see 8.4.8.1.4)if (STC == 0b01 or STC == 0b10){0b00 = Matrix A0b01 = Matrix B0b10 = Matrix C0b11 = Reserved}else if (STC == 0b11){0b00 = Matrix A0b01 = Matrix B0b10)11 = Reserved} |
| DL_PermBase | 5 | — |
| PRBS_ID | 2 | Values: 0 . . . 2. Refer to 8.4.9.4.1 |
| AMC type | 2 | Indicates the AMC type in case permutation type = 0b11, otherwise shall be set to 0.AMC type (N × M = N bins by M symbols): 0b00: 1 × 6, 0b01: 2 × 3, 0b10: 3 × 2, 0b11: Reserved, Note that only 2 × 3 band AMC subchannel type (AMCType = 0b01) is supported by MS |
| Midamble presence | 1 | 0: Not present, 1: MIMO midamble present at the first symbol in STC zone |
| Midamble boosting | 1 | 0: No boost, 1: Boosting (3 dB) |
| 2/3 antennas select | 1 | 0: STC using 2 antennas, 1: STC using 3 antennas, Selects 2/3 antennas when STC = 0b01 |
| Dedicated Pilots | 1 | 0: Pilot symbols are broadcast1: Pilot symbols are dedicated. An MS should use only pilots specific to its burst for channel estimation |
| Reserved | 4 | Shall be set to zero |
| } | — | — |

It is defined that the same antenna scheme and the same permutation are used in the permutation zone.

Meanwhile, in a 3rd generation partnership project (3GPP) long term evolution (LTE) system, different antenna schemes can be supported at the same time. For example, in one OFDM symbol, a transmit diversity scheme may be used for one UE, and at the same time, a CDD-based precoding scheme may be used for another UE. In this case, the number of Tx antennas is fixed, and a pilot structure is fixed according to an antenna. That is, although different antenna schemes are supported at the same time, pilots are arranged in a fixed structure along the entire frequency band in a subframe. The 3GPP LTE system defines a pilot structure for the transfer of general data and a pilot structure for a multimedia broadcast multicast service (MBMS), and can have a pilot structure for beamforming. A pilot for data transmission has a structure in which a channel of each Tx antenna is divided using frequency division multiplexing (FDM)/time division multiplexing (TDM). A pilot for beamforming has a structure for rank-1 transmission. In this case, the pilot for beamforming is defined to use a dedicated pilot. The pilot structure of the 3GPP LTE system is similar to that of a permutation zone of the IEEE 802.16 system in that three pilots are used by being divided in the time domain.

The IEEE 802.16 system and the 3GPP LTE system define a dedicated pilot for precoding/beamforming. The dedicated pilot is a pilot for expressing a precoding weight or a beamforming weight. The precoding weight is transmitted using the dedicated pilot, and thus a receiver can directly use a channel estimated using a pilot to demodulate data without having to additionally estimate the precoding weight. Since the precoding weight is transmitted using the dedicated pilot, additional signaling is not required for the precoding weight, thereby reducing an overhead caused by control signaling. In particular, the dedicated pilot can be effectively used in a system (e.g., MU-MIMO) in which a desired weight varies in a receiving end.

In precoding, a precoding vector is used for a rank 1, and a precoding matrix is used for a rank 2 or higher ranks. According to a rank of a weight used in precoding/beamforming, the weight may be differently transmitted using the dedicated pilot. For example, the weight can be transmitted using the dedicated pilot by distinguishing a vector corresponding to each rank of a precoding/beamforming weight. In rank-N transmission of a system having M Tx antennas, an M×N weight matrix is used. To transmit each of N vectors having a size of M×1 by using dedicated pilots, a pilot structure capable of distinguishing the M Tx antennas can be used (where M and N are integers greater than or equal to 1).

In the rank-N transmission, N streams are generated. One receiver can be allocated with one or more streams. The N streams can be allocated to up to N receivers. This can be applied to an MU-MIMO system or a beamforming system using multi-beams. In this case, a dedicated pilot for each stream is allocated, and information transmitted through an nth stream is decoded using channel information estimated through an nth dedicated pilot. In rank-N transmission of SU-MIMO in which all streams are allocated to one receiver, a precoding weight can also be transmitted by allocating the dedicated pilot for each stream.

The MIMO system can adaptively select a rank suitable for transmission according to a geometry. A low rank can be selected in a low geometry. A high rank can be selected in a high geometry. If it is assumed that the number of pilots required for streams to be transmitted is equal to the number of pilots for distinguishing Tx antennas, when a weight vector is transmitted through a pilot, a pilot structure suitable for each rank can be used by referencing a pilot defined according to the number of Tx antennas in the multiple-antenna system. For example, a precoding weight can be transmitted in such a manner that a pilot structure for one Tx antenna is used for rank-1 transmission and a pilot structure for two Tx antennas is used for rank-2 transmission. However, since the same pilot structure is used in the same permutation zone, a specific pilot structure is used in one permutation zone irrespective of a rank value. In a system in which a weight vector is transmitted through a pilot, one permutation can be assigned to multiple users, and a preferred rank may differ from one user to another. Therefore, when a pilot structure is selected according to a rank suitable for one user in a permutation zone, the pilot structure may not suitable for another use. For example, if the pilot structure is selected according to a maximum rank that can be used in the permutation zone, an unnecessarily large number of pilots are assigned to a user who prefers a low rank, resulting in waste or radio resources.

Now, a pilot arrangement depending on a Tx antenna and a pilot arrangement depending on a stream in a permutation zone will be described. A preamble, a midamble, a common pilot, etc., can be used to estimate a channel of a physical antenna. The common pilot is referred to as a cell-specific pilot. The common pilot can vary according to an antenna scheme or the number of antennas supported in a specific cell. As a method for estimating a channel of a virtual antenna, there is a method for combining precoding and a channel estimated using a physical antenna. As another method for estimating a channel of a virtual antenna, there is a method for using a dedicated pilot for the virtual antenna. The dedicated pilot is referred to as a UE-specific pilot, and a pilot structure can vary according to a maximum number of streams supported in a receiver.

Figure 5:
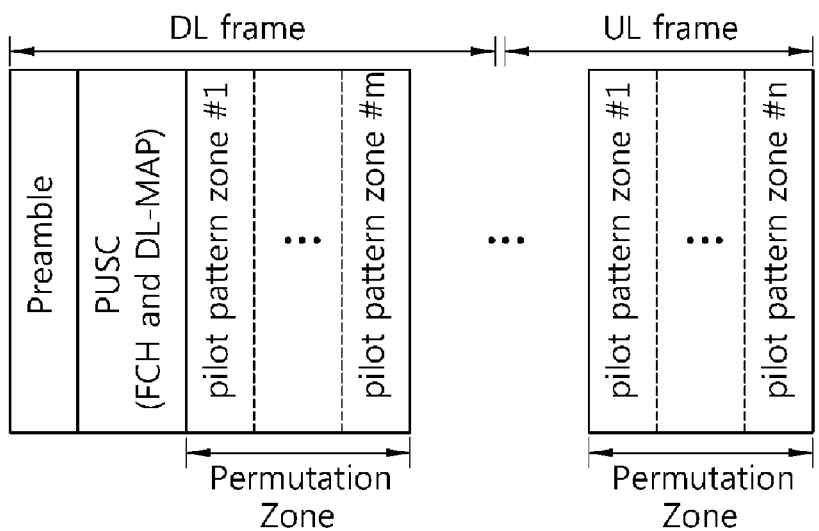
FIG. 5 shows a frame according to an embodiment of the present invention.

FIG. 5 shows a frame according to an embodiment of the present invention.

Referring to FIG. 5, the frame includes at least one permutation zone. At least one pilot pattern zone is included in the permutation zone. There is no limit in a type of permutation applied to a DL frame and a UL frame. A pilot pattern zone is a zone to which pilots having the same pattern are applied. That is, at least one permutation zone is included in a frame, and a plurality of pilot patterns can be applied to one permutation zone irrespective of the type of permutation. The pilot pattern may be a common pilot pattern or a dedicated pilot pattern. The common pilot pattern can be arranged in a specific pattern irrespective of a rank. The dedicated pilot pattern can be arranged in various patterns according to a rank or the number of antennas.

The pilot pattern zone can be assigned to users to which the same number of antennas and the same number of streams are applied in the multiple antenna system.

For example, when data of a first user who prefers a rank 1 and data of a second user who prefers a rank 2 are transmitted through a PUSC permutation zone of a DL frame, the PUSC permutation zone is divided into a first pilot pattern zone having a pilot pattern corresponding to the rank 1 and a second pilot pattern zone having a pilot pattern corresponding to the rank 2. The first user data is transmitted through the first pilot pattern zone. The second user data is transmitted through the second pilot pattern zone. In this case, information on the first pilot pattern zone and the second pilot pattern zone in the PUSC permutation zone can be transmitted through an FCH and a DL-MAP.

Herein, although the pilot pattern zone is divided in a time domain in a permutation zone, the pilot pattern zone may also be divided in a frequency domain or a time-frequency domain in the permutation zone. That is, the pilot pattern zone can be divided not only using a TDM scheme but also an FDM scheme. In one permutation zone, dedicated pilot patterns may be assigned to one pilot pattern zone and adjacent another pilot pattern zone, so that the dedicated pilot patterns are combined using the TDM scheme or the FDM scheme. Alternatively, a common pilot pattern may be assigned to one pilot pattern zone and a dedicated pilot pattern may be assigned to adjacent another pilot pattern zone, so that the common pilot pattern and the dedicated pilot pattern are combined using the TDM scheme or the FDM scheme. Of course, in one pilot pattern zone, a common pilot pattern having a specific pattern and a dedicated pilot pattern that varies according to a rank can be combined and assigned. In this case, the common pilot pattern and the dedicated pilot pattern can be combined using the TDM scheme or the FDM scheme.

<Dedicated Pilot for Virtual Antenna>

It can be considered that a dedicated pilot for a virtual antenna is assigned to a pilot pattern zone. The dedicated pilot for the virtual antenna has a UE-specific pilot structure. A UE-specific pilot pattern can be applied in a resource region allocated to a receiver. The structure of the pilot used for the virtual antenna can be determined according information (i.e., the number of steams or the number of virtual antennas) transmitted to the receiver. For example, a transmitter having four Tx antennas can transmit up to four streams. The receiver can determine a maximum number of available streams according to a channel condition and a reception capability. When the receiver has two Rx antennas, the receiver can receive up to two streams. When the receiver has four Rx antennas, the receiver can receive up to four streams. If a maximum throughput can be obtained when the receiver having four Rx antennas receives two streams according to an antenna combination geometry, a precoding weight for the two streams can be used. One or two streams can be transmitted according to a resource allocated to the receiver, and as a result, a pilot suitable for the stream is used.

The number of virtual antennas may be arbitrarily determined by the transmitter, or may be determined when the number of streams preferred by the receiver is reported. The receiver may report the number of preferred streams to the transmitter according to the reception capability of the receiver or channel condition measurement, and the transmitter may determine the number of virtual antennas at the request of the receiver. Alternatively, the transmitter may determine the number of virtual antennas according to a transfer size of data to be transmitted or according to whether data is retransmitted.

For example, if the transfer size of data to be transmitted is significantly small, the transmitter can limit the number of streams to be less than or equal to '2' even in a channel condition where the receiver can receive four streams. In this case, the transmitter can limit the number of streams by using a precoding weight suitable for the number of streams to be limited. Alternatively, the transmitter may transmit data by carrying the data only on some of the four streams without carrying the data on the remaining streams.

The transmitter can transmit retransmission data by using a smaller number of streams than the number of streams used for initial data. When a retransmission request is received for the initial data, this means that a channel condition is not good. If the retransmission request is received when the transmitter transmits data at a high rank, the transmitter transmits the retransmission data at a lower rank than the rank used in the previously transmitted data, so that transmission is robust to the channel condition.

<Pilot Combination>

Pilots having different types and usages can be assigned to one permutation zone or pilot pattern zone. That is, a plurality of pilot patterns having different patterns can be combined and assigned. The pilots having different patterns can be combined using the TDM scheme or the FDM scheme. In addition, one pilot pattern can be assigned to a fixed position and another pilot pattern can be assigned to a position adjusted according to a shift value.

A pilot for a physical antenna is used for carrier-to-interference-and-noise ratio (CINR) measurement, rank selection, control channel decoding, etc. The pilot for the physical antenna can be combined with the pilot for the virtual antenna by using the TDM scheme. Alternatively, the pilot for the physical antenna and the pilot for the virtual antenna can be combined using the FDM scheme. For example, when a MIMO scheme (e.g., SIMO, STC, spatial multiplexing, etc.)

in which data demodulation is performed using a channel of the physical antenna and a MIMO scheme (e.g., SDMA) in which data demodulation is performed using the virtual antenna are both supported in one OFDM symbol, two pilots to be used can be combined using the FDM scheme. In this case, each pilot is used to demodulate a data signal.

When the pilot for the physical antenna and the pilot for the virtual antenna are combined using the TDM scheme or the FDM scheme, the pilot for the physical antenna can be assigned to a specific position having a shift value for each cell, and the pilot for the virtual antenna can be assigned to a fixed position.

To reduce inter-cell interference, the position of the physical pilot can be adjusted according to a cell. If k denotes a frequency index and m denotes a logical index of a pilot, positions of M physical pilots can be determined according to Equation 1 below.

MathFigure 1

$$k = a \times m + b$$

Herein, m=0, ..., M−1. In addition, a denotes a frequency interval between pilots, and b denotes a cell-specific shift value. The M physical pilots are mapped to the frequency index k with the interval of a. In this case, the physical pilots can be mapped to different indices between cells according to the cell-specific shift value b.

Pilot power boosting can be performed to improve channel estimation performance. When pilots between adjacent cells collide with one another, a power-boosted pilot may act as strong interference to a pilot which is not power-boosted. The use of the cell-specific shift value b may result in the collision of pilots between adjacent cells and data subcarriers between adjacent cells, but can improve the channel estimation performance since interference caused by the collision of pilots can be reduced.

A radial pattern of an omni antenna is distributed with power having the almost same strength in a cell. On the other hand, in case of a directional antenna, power distribution is different according to a position in the cell. For example, in a system in which the pilot for the virtual antenna is used for beamforming, any radio resource in a frequency domain or a time domain may experience strong interference in a certain region according to a location of a user whereas interference may almost not exist in another region. That is, since the pilot for the virtual antenna is transmitted using a beamforming weight, the pilot may be received as a strong signal by a certain receiver and may be received as a weak signal by another receiver. Therefore, it is not appropriate to apply a method for shifting or hopping a pilot index to the pilot for the virtual antenna to reduce interference among pilots. Preferably, the pilot for the virtual antenna is assigned to a fixed position to obtain an effect in which inter-cell interference values are averaged such as in random beamforming.

Meanwhile, a pilot having a shift value and a pilot having a fixed position can be combined by considering a radio resource allocation scheme. The radio resource allocation scheme may include distributed allocation or localized allocation. In the distributed allocation, a plurality of subcarriers allocated to a UE are mapped by being distributed in the frequency domain or the time domain. The distributed allocation may include FUSC and PUSC permutations. In the localized allocation, the plurality of subcarriers allocated to the UE are contiguously mapped. The localized allocation may include an AMC permutation.

When a pilot for distributed allocation and a pilot for localized allocation are combined using the TDM scheme or the FDM scheme, the pilot for distributed allocation can be assigned to a specific position having a shift value and the pilot for localized allocation can be assigned to a fixed position. A BS may determine the shift value to be a UE-specific value and then report the determined shift value. The pilot for distributed allocation and the pilot for localized allocation may be UE-specific pilots.

<Pilot Pattern Indication for Virtual Antenna>

A dedicated pilot pattern can be indicated through a control channel. Information on a structure of the dedicated pilot pattern can be indicated through a UE-specific control channel, that is, a dedicated control channel.

A frame can be divided into a zone where a common pilot is used and a zone where a dedicated pilot is used. The zone where the common pilot is used and the zone where the dedicated pilot is used can be indicated through a common control channel. The common control channel is used to transmit cell- or sector-specific control information. A cell-specific antenna scheme can be applied to the common control channel. A pilot for a physical antenna can be used in the common control channel. Table 2 shows an example of control information transmitted through the common control channel.

TABLE 2

| control information | description |
|---|---|
| # of antenna in cell/sector | |
| Antenna scheme | STC, SM, beamforming, Channel (in)dependant Precoding, etc. |
| Resource allocation scheme | PUSC, FUSC, AMC, Distributed, Localized, Interleaved allocation, etc. |
| Pilot for estimating physical antenna channel | Preamble, Midamble, etc. |
| Pilot's power boosting level | The value of boosted level (0, 3, 6 dB, etc.) |
| Dedicated Pilot indicator | On/Off |
| MU-MIMO scheme indicator | On/Off |
| Zone duration | Common pilot zone and Dedicated pilot zone/permutation zone |

A dedicated pilot indicator can be used to indicate whether to use a dedicated pilot. Whether to use the dedicated pilot can be known from the dedicated pilot indicator transmitted through the common control channel. If the dedicated pilot indicator indicates the use of the dedicated pilot, a receiver finds the dedicated pilot and uses the found dedicated pilot for data decoding or CINR measurement. If the dedicated pilot indicator is not used, a zone duration in which the dedicated pilot is used can be defined, and then the defined zone duration can be reported through the common control channel or higher-layer signaling. Accordingly, even if the dedicated pilot indicator is not used, a receiver using the dedicated pilot and a receiver using the common pilot can precisely distinguish pilots to be used by the receivers in a process of data decoding, CINR measurement, etc.

When the use of the dedicated pilot is indicated through the common control channel, a UE receives a UE-specific control message through the dedicated control channel. The UE-specific control message is a control message for a specific UE, and indicates a pattern of the dedicated pilot, the number of streams, a rank, or the like. When the dedicated pilot is used in MU-MIMO, the UE-specific control message includes the number of streams and a stream number to report a pilot to be used by the UE.

<Resource Allocation Using Dedicated Pilot Pattern>

In a system using a dedicated pilot, resources can be allocated according to a maximum number of streams supported in a transmitter. That is, a range of OFDM symbols on which pilots are arranged can vary according to the number of streams, and a basic unit of radio resource allocation can be set to the range of OFDM symbols determined according to the number of streams. In addition, the basic unit of radio resource allocation can be set to a range occupied by a pilot pattern for a physical antenna along a time domain or a frequency domain.

For example, when a dedicated pilot is used in an AMC permutation zone, a dedicated pilot of one stream is arranged throughout two OFDM symbols, and a dedicated pilot for two streams is arranged throughout four OFDM symbols. When one stream is used in the AMC permutation zone, two OFDM symbols are the basic unit of radio resource allocation, and when two streams are used in the AMC permutation zone, four OFDM symbols are the basic unit of radio resource allocation. If radio resources are allocated both to a UE using one stream and a UE using two streams in one pilot pattern zone, at least four OFDM symbols can be allocated to the UE using one stream with respect to the UE using two streams.

In the STC and spatial multiplexing schemes, a channel can be estimated using a dedicated pilot, and decoding can be performed through the estimated channel. Table 3 shows an example of a weight according to a MIMO scheme.

TABLE 3

| Number of Tx Antenna | MIMO scheme | Weight (Tx antenna * Stream) |
|---|---|---|
| 2 Tx | STBC/SFBC | $\begin{bmatrix}1\\0\end{bmatrix}, \begin{bmatrix}0\\1\end{bmatrix}$ |
| | CDD | $\begin{bmatrix}\alpha e^{j\theta_1}\\ \beta e^{j\theta_2}\end{bmatrix}$ |
| | Spatial Multiplexing | $\begin{bmatrix}1\\0\end{bmatrix}, \begin{bmatrix}0\\1\end{bmatrix}$ |
| | Rank 1 (Beamforming/Precoding) | $\begin{bmatrix}\alpha e^{j\theta_1}\\ \beta e^{j\theta_2}\end{bmatrix}$ |
| | Rank 2 (Beamforming/Precoding) | $\begin{bmatrix}\alpha e^{j\theta_1}\\ \beta e^{j\theta_2}\end{bmatrix}, \begin{bmatrix}\gamma e^{j\theta_3}\\ \delta e^{j\theta_4}\end{bmatrix}$ |

When transmission is achieved using two Tx antennas, in case of STBC or SFBC, two streams are transmitted by using two symbols (or two subcarriers). A unit vector can be used as a weight capable of identifying each antenna, and can be transmitted as the weight in order to identify the two Tx antennas. In spatial multiplexing, transport channels for the two Tx antennas have to be ensured. The unit vector can be used for spatial multiplexing when using a dedicated pilot. According to the MIMO scheme, the weight can be extended for the case of using three or four Tx antennas. The MIMO scheme can be variously applied such as SFBC-FSTD, spatial multiplexing-antenna selection, double STTD, CDD, etc.

The STC or the spatial multiplexing can be performed by distinguishing steams of Tx antennas. For example, among four Tx antennas, two Tx antennas can be used for beamforming of a rank 1, and the remaining two Tx antennas can also be used for beamforming of the rank 1. The STC and the spatial multiplexing can be performed by using two streams transmitted through two Tx antennas. In this case, a dedicated pilot can be used to distinguish the two streams transmitted through the two Tx antennas.

Hereinafter, examples of a pilot arrangement in a pilot pattern zone will be described. Pilots for each Tx antenna is assigned to estimate N×R channels between a transmitter having N physical antennas and a receiver having R physical antennas. The pilots are arranged in a specific pattern in a specific permutation zone according to the number of Tx antennas or according to a stream. The pilots can be distinguished with frequency, time, or code. There is no restriction that the exemplary pilot pattern is used only in the specific permutation zone, and thus the pilot pattern can also be used in another permutation zone.

Figure 6:
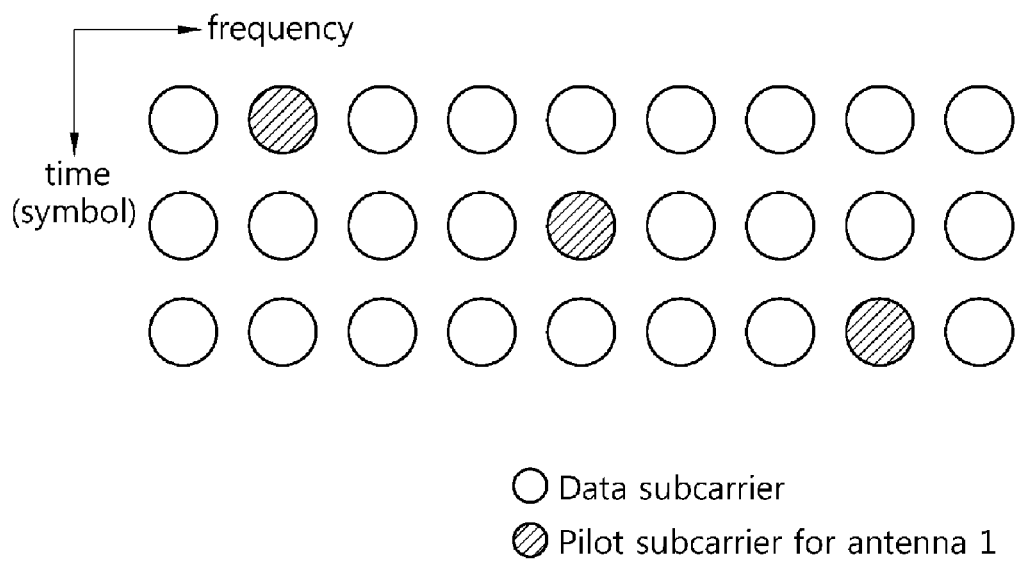
FIG. 6 shows an example of a pilot arrangement depending on a transmit (Tx) antenna.

FIG. 6 shows an example of a pilot arrangement depending on a Tx antenna.

In a pilot pattern of FIG. 6, one Tx antenna is used in an AMC permutation zone. A basic unit of radio resource allocation can be set to 3 OFDM symbols in a time domain and 9 subcarriers in a frequency domain.

Figure 7:
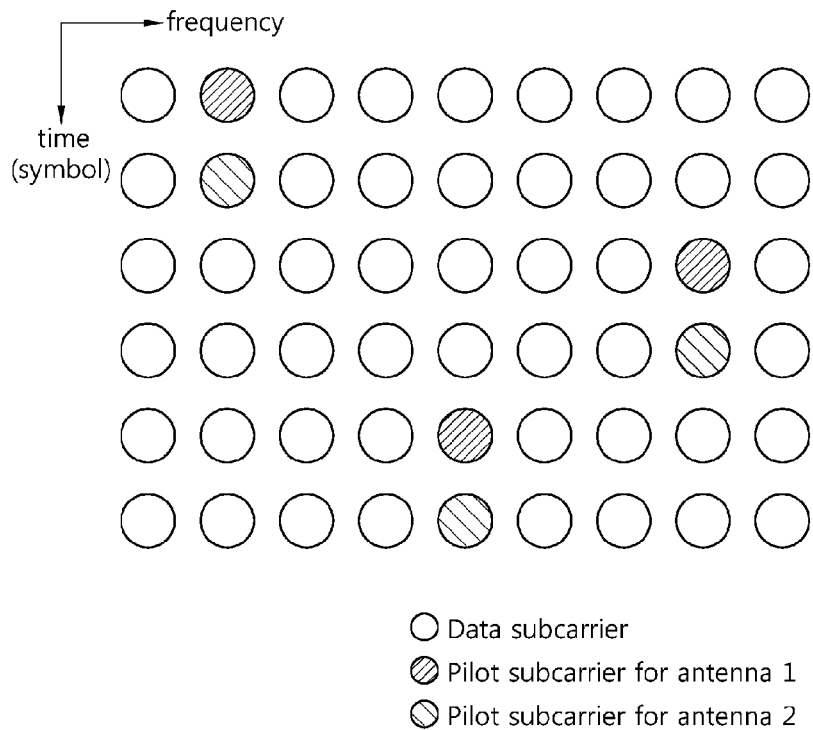
FIG. 7 shows another example of a pilot arrangement depending on a Tx antenna.

FIG. 7 shows another example of a pilot arrangement depending on a Tx antenna.

In a pilot pattern of FIG. 7, two Tx antennas are used in an AMC permutation zone. A basic unit of radio resource allocation can be set to 6 OFDM symbols in a time domain and 9 subcarriers in a frequency domain.

Figure 8:
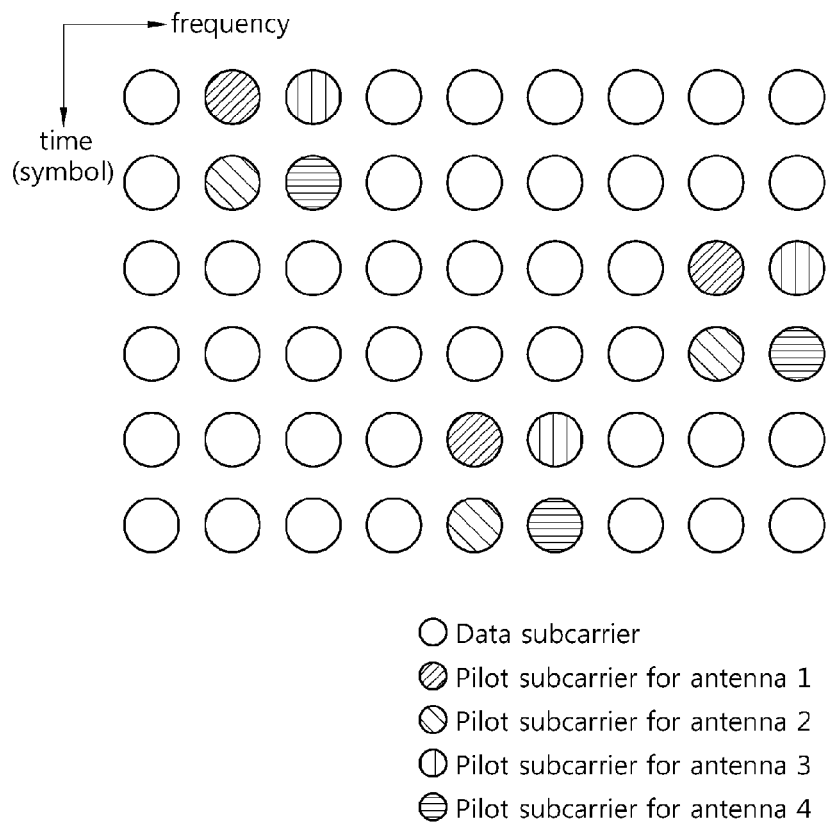
FIG. 8 shows another example of a pilot arrangement depending on a Tx antenna.

FIG. 8 shows another example of a pilot arrangement depending on a Tx antenna.

In a pilot pattern of FIG. 8, four Tx antennas are used in an AMC permutation zone. A basic unit of radio resource allocation can be set to 6 OFDM symbols in a time domain and 9 subcarriers in a frequency domain.

The AMC permutation zone can be divided into a plurality of pilot pattern zones according to the number of Tx antennas. In each pilot pattern zone, pilots can be arranged conforming to the pilot patterns of FIGS. 6 to 8 according to the number of Tx antennas.

Figure 9:
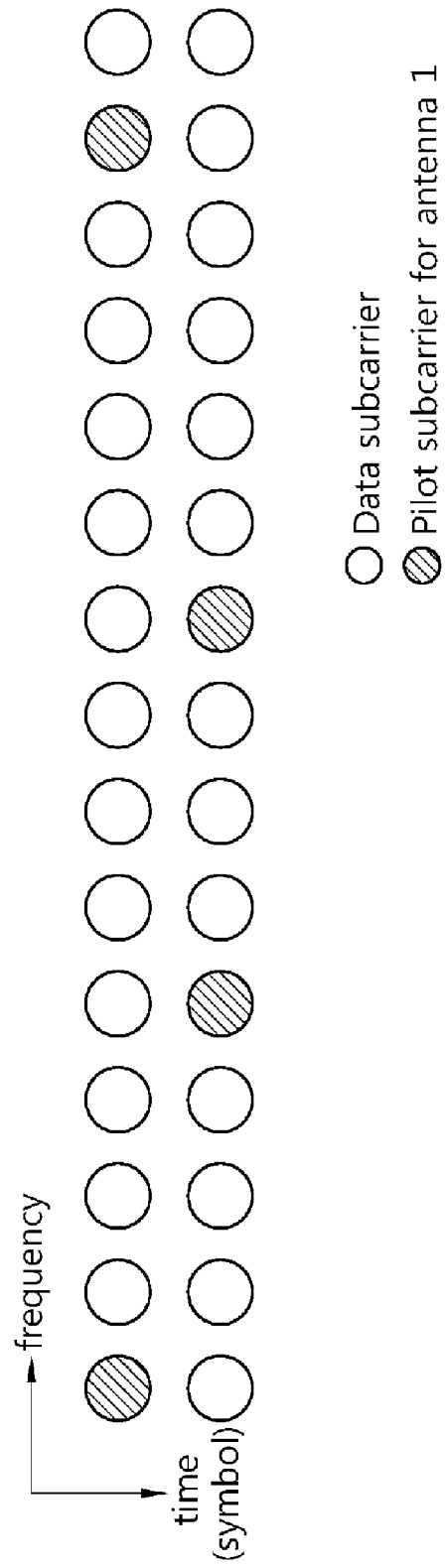
FIG. 9 shows another example of a pilot arrangement depending on a Tx antenna.

FIG. 9 shows another example of a pilot arrangement depending on a Tx antenna.

A pilot pattern of FIG. 9, one Tx antenna is used in a PUSC permutation zone. A basic unit of radio resource allocation can be set to 2 OFDM symbols in a time domain and 15 subcarriers in a frequency domain.

Figure 10:
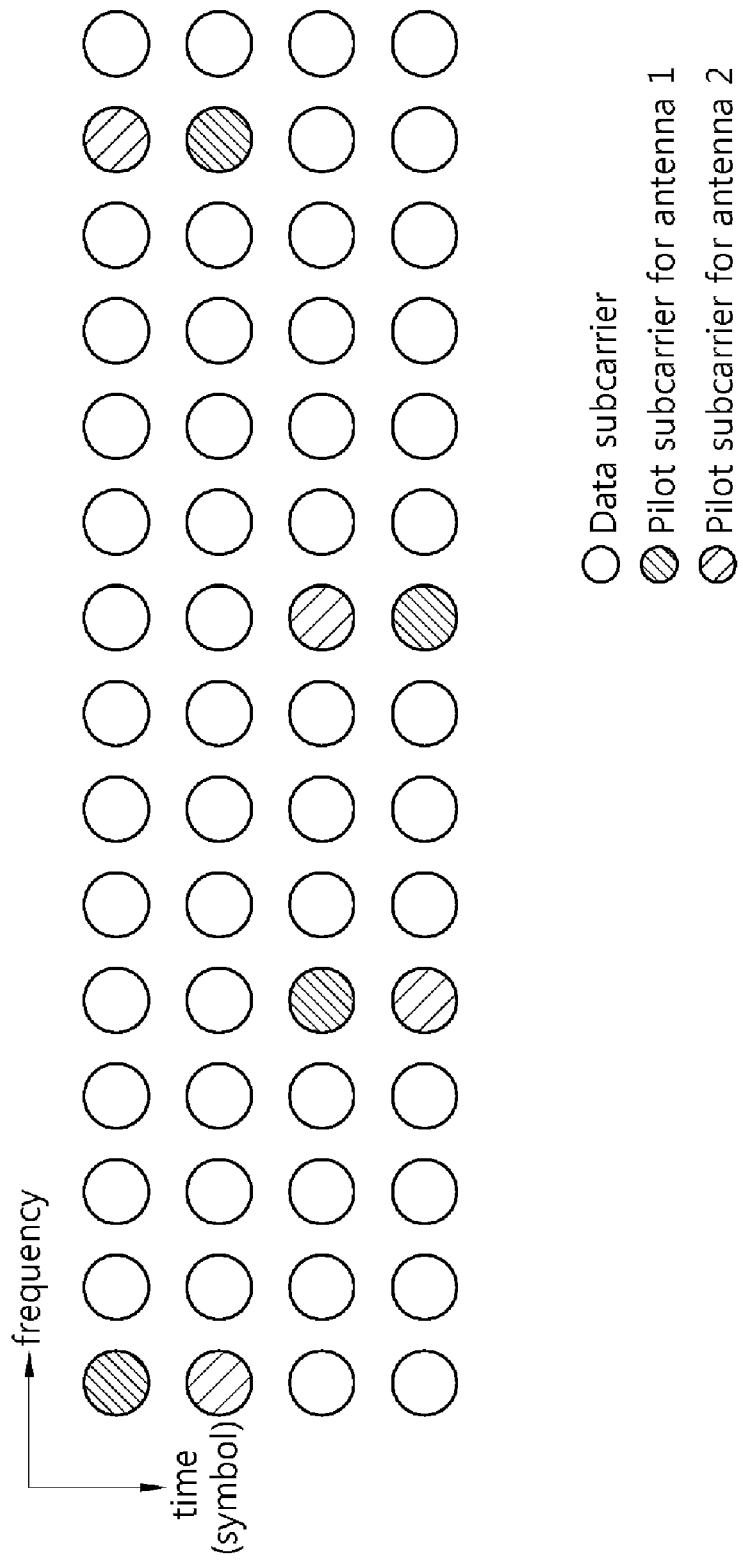
FIG. 10 shows another example of a pilot arrangement depending on a Tx antenna.

FIG. 10 shows another example of a pilot arrangement depending on a Tx antenna.

In a pilot pattern of FIG. 10, two Tx antennas are used in a PUSC permutation zone. A basic unit of radio resource allocation can be set to 4 OFDM symbols in a time domain and 15 subcarriers in a frequency domain.

Figure 11:
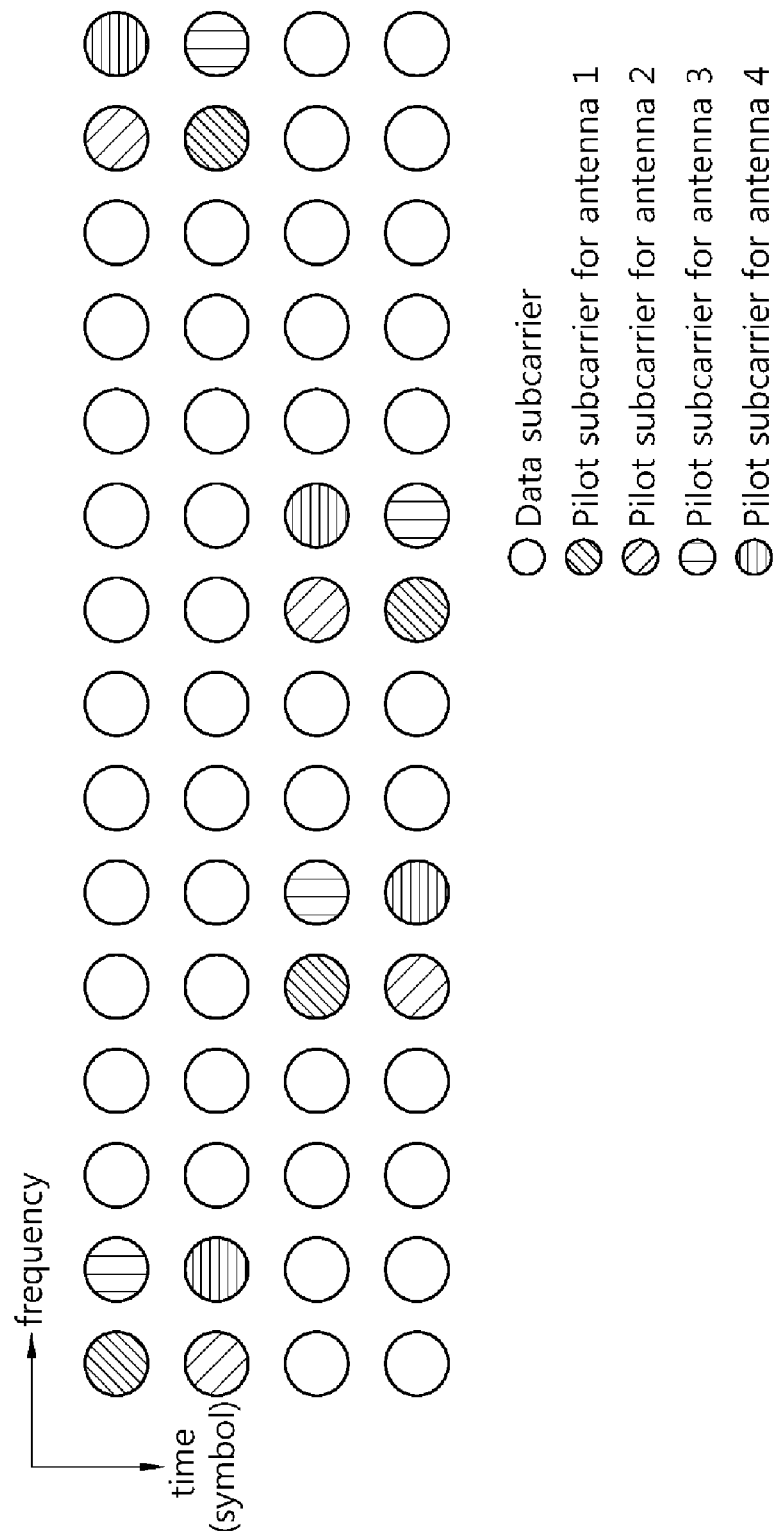
FIG. 11 shows another example of a pilot arrangement depending on a Tx antenna.

FIG. 11 shows another example of a pilot arrangement depending on a Tx antenna.

In a pilot pattern of FIG. 11, four Tx antennas are used in a PUSC permutation zone. A basic unit of radio resource allocation can be set to 4 OFDM symbols in a time domain and 15 subcarriers in a frequency domain.

The PUSC permutation zone can be divided into a plurality of pilot pattern zones according to the number of Tx antennas. In each pilot pattern zone, pilots can be arranged conforming to the pilot patterns of FIGS. 9 to 11 in each pilot pattern zone according to the number of Tx antennas.

Figure 12:
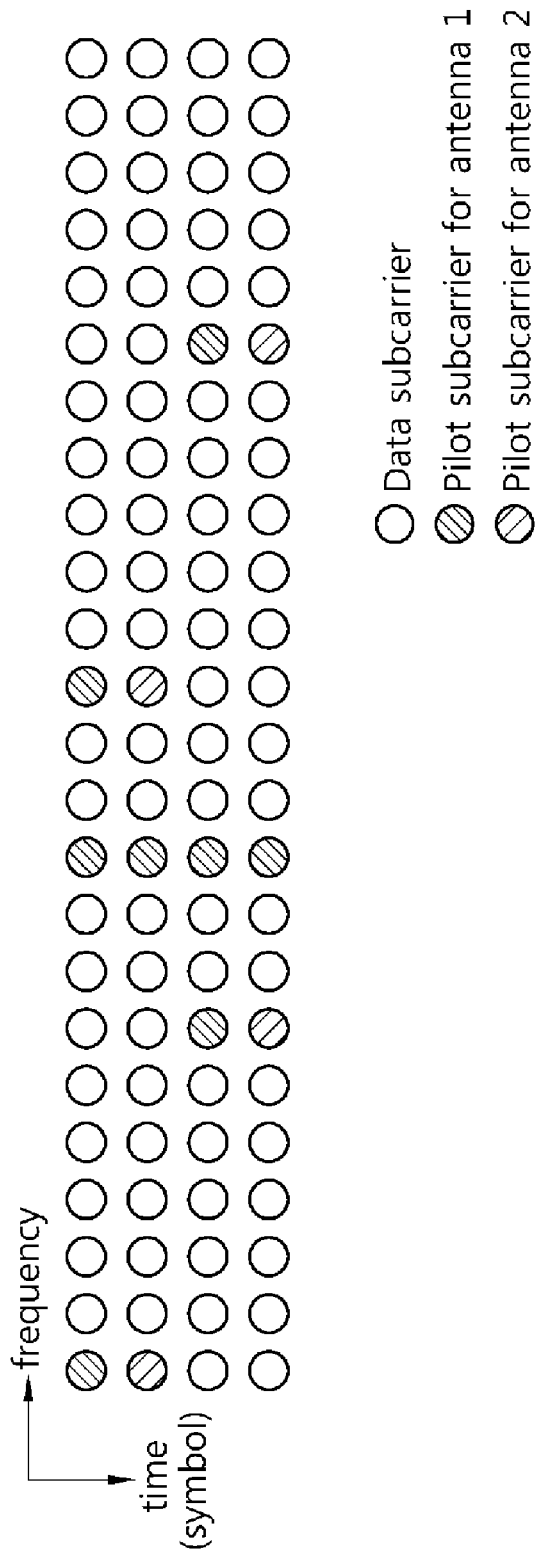
FIG. 12 shows another example of a pilot arrangement depending on a Tx antenna.

FIG. 12 shows another example of a pilot arrangement depending on a Tx antenna.

In a pilot pattern of FIG. 12, two Tx antennas are in an FUSC permutation zone. A basic unit of radio resource allocation can be set to 4 OFDM symbols in a time domain and 24 subcarriers in a frequency domain.

Figure 13:
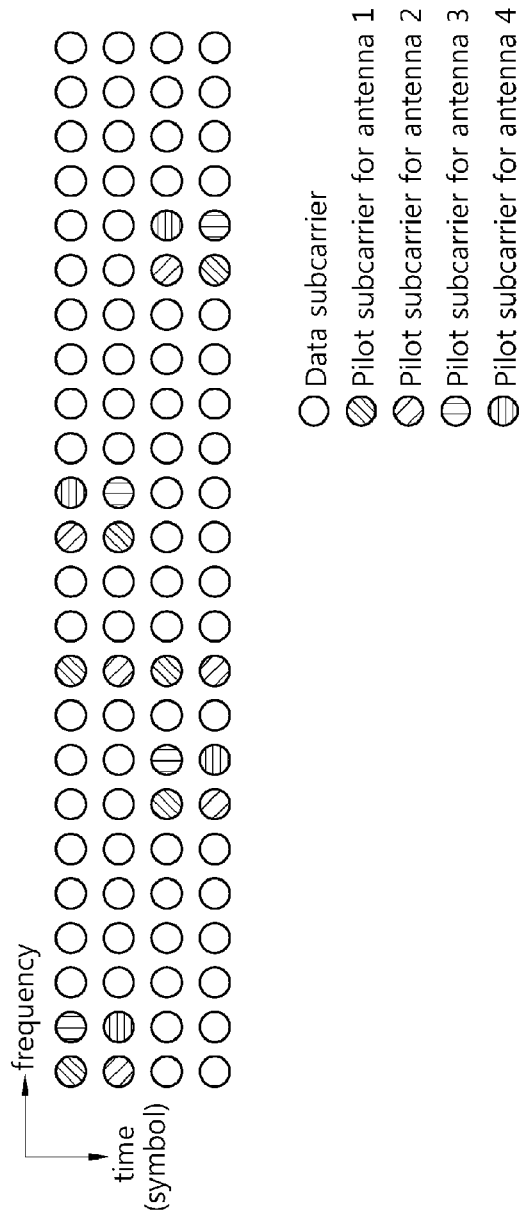
FIG. 13 shows another example of a pilot arrangement depending on a Tx antenna.

FIG. 13 shows another example of a pilot arrangement depending on a Tx antenna.

In a pilot pattern of FIG. 13, four Tx antennas are used in an FUSC permutation zone. A basic unit of radio resource allocation can be set to 4 OFDM symbols in a time domain and 24 subcarriers in a frequency domain.

The FUSC permutation zone can be divided into a plurality of pilot pattern zones according to the number of Tx antennas. In each pilot pattern zone, pilots can be arranged conforming to the pilot patterns of FIGS. 12 to 13 according to the number of Tx antennas.

Figure 14:
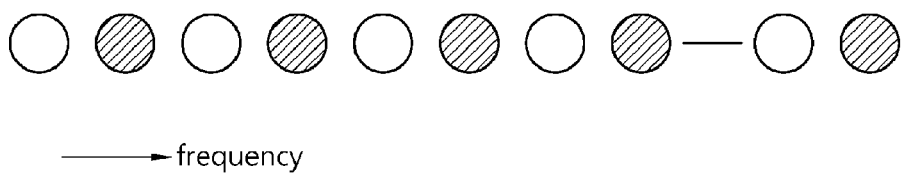
FIG. 14 shows another example of a pilot arrangement depending on a Tx antenna.

FIG. 14 shows another example of a pilot arrangement depending on a Tx antenna.

Referring to FIG. 14, a common synchronization (SYNC) symbol can be allocated to a last OFDM symbol of a DL frame. The common SYNC symbol is a pilot transmitted from a BS to attain synchronization of a UE. The common SYNC symbol can be allocated to a last OFDM symbol of a permutation zone located in a temporally last position in the DL frame.

Figure 15:
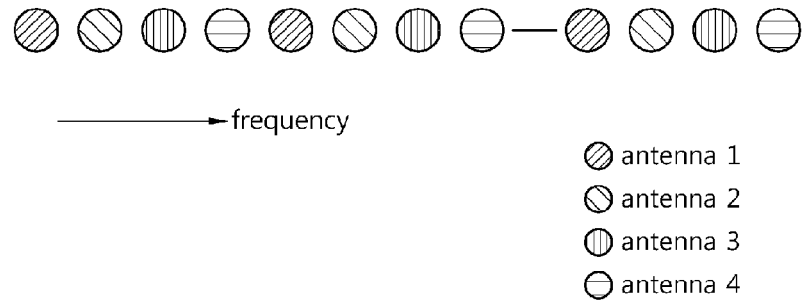
FIG. 15 shows another example of a pilot arrangement depending on a Tx antenna.

FIG. 15 shows another example of a pilot arrangement depending on a Tx antenna.

In a midamble of FIG. 15, four Tx antennas are used in an FUSC permutation zone. The midamble can consist of one OFDM symbol. All subcarriers of the OFDM symbol can be used as a pilot. In the midamble, symbols for multiple antennas are mapped to subcarriers by avoiding overlapping. When assigned, the midamble may be included in any pilot pattern zone in a permutation zone. Alternatively, the midamble can be assigned independently from the pilot pattern zone. In addition to the FUSC permutation zone, the midamble can be assigned to another permutation zone.

Figure 16:
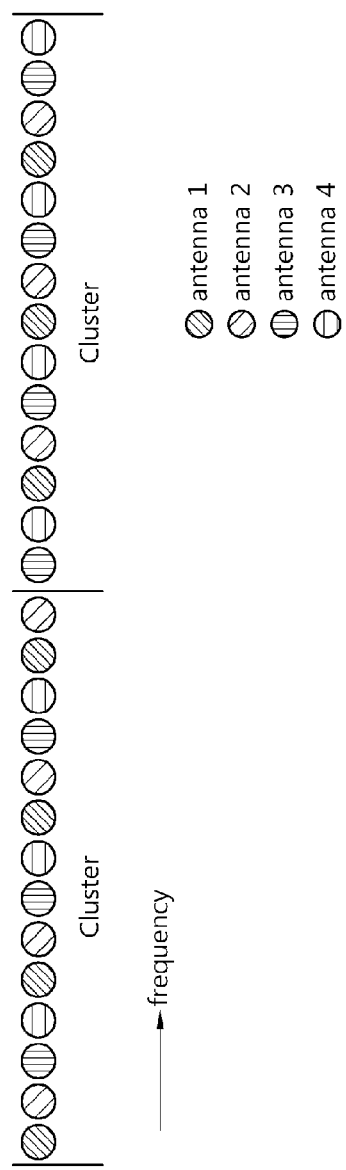
FIG. 16 shows another example of a pilot arrangement depending on a Tx antenna.

FIG. 16 shows another example of a pilot arrangement depending on a Tx antenna.

In a midamble of FIG. 16, four Tx antennas are used in a PUSC permutation zone. The midamble can be segmented by being grouped into a cluster including a plurality of subcarriers according to a data region.

Figure 17:
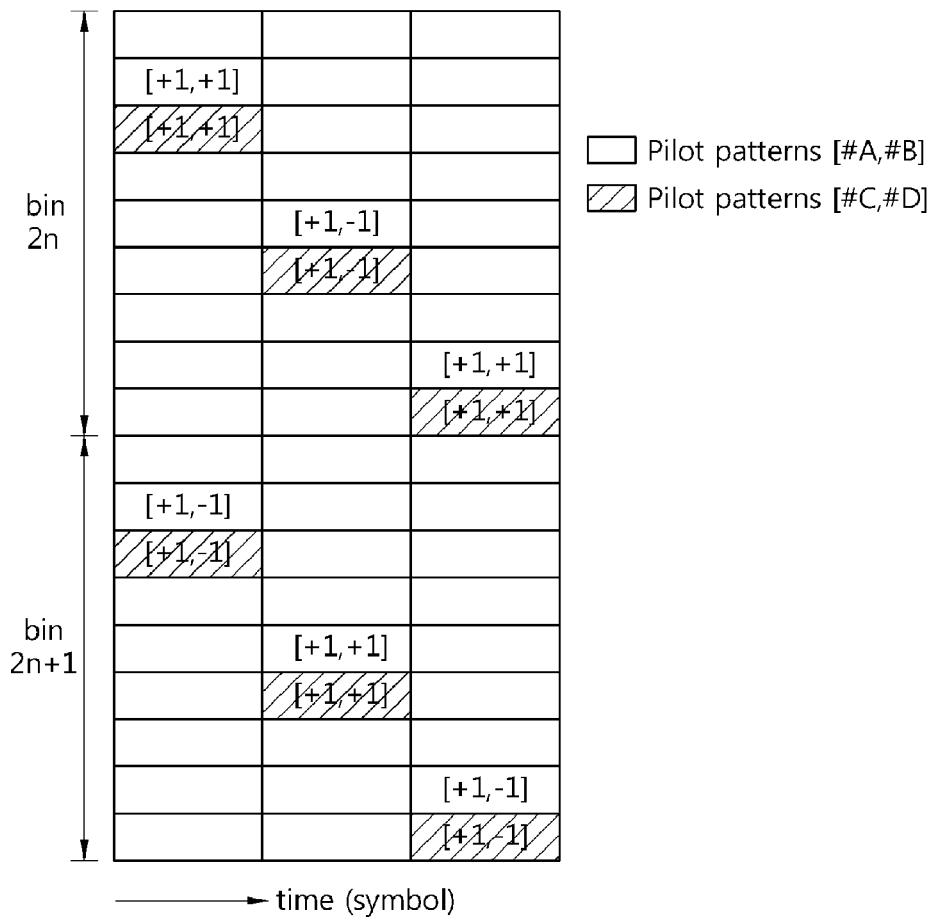
FIG. 17 shows an example of a pilot arrangement depending on a stream.

FIG. 17 shows an example of a pilot arrangement depending on a stream.

Referring to FIG. 17, a pilot pattern is used in an adaptive antenna system (AAS) mode in an AMC permutation zone. A pilot of a stream #A and a pilot of a steam #B are divided by one orthogonal code, and a pilot of a stream #C and a pilot of a stream #D are divided by another orthogonal code. The pilot of the steam #C and the pilot of the stream #D can be assigned after data subcarriers are punctured. The streams #A/#B and the streams #C/#D are divided in a time-frequency domain.

Although several pilot patterns that can be used in each permutation zone have been described above, this is for exemplary purposes only, and thus the present invention is not limited thereto. A pilot pattern usable in a permutation zone can be variously applied. A specific pilot pattern is applied for each pilot pattern zone that is divided according to a stream or the number of antennas in each permutation zone.

Figure 18:
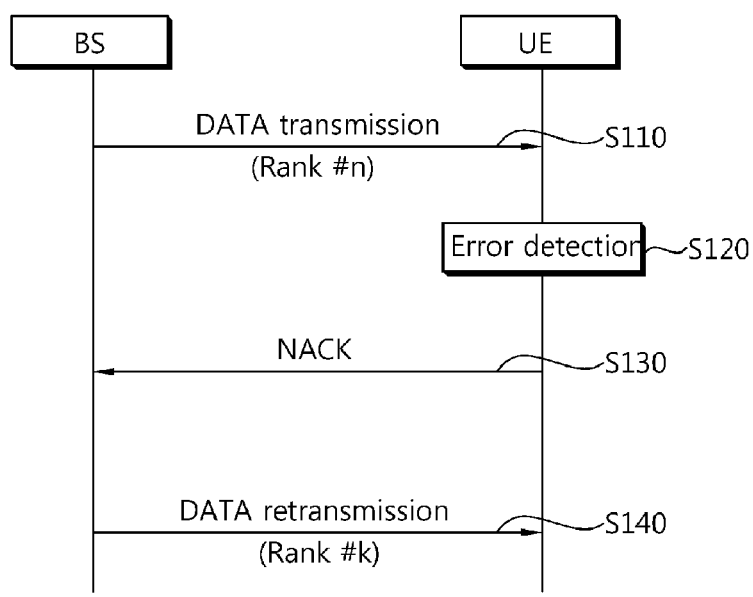
FIG. 18 is a flow diagram showing a data transmission method according to an embodiment of the present invention.

FIG. 18 is a flow diagram showing a data transmission method according to an embodiment of the present invention.

Referring to FIG. 18, a BS transmits data to a UE (step S110). The BS determines a transmission rule (i.e., a permutation rule, a MIMO scheme, etc.) to be applied to the UE by considering a channel condition and a capability of the UE. The channel condition and the capability are reported in advance to the BS by the UE. The BS allocates radio resources according to the determined permutation rule or MIMO scheme. For example, when the BS intends to transmit data to the UE according to an AMC permutation rule and a rank n, the BS assigns a pilot pattern zone for the rank n in an AMC permutation zone of a DL frame. The BS transmits the data to the UE by using the assigned pilot pattern zone. In this case, the BS indicates the pilot pattern applied to the UE through a dedicated control channel.

The UE detects an error from the received data (step S120). The UE can know whether a dedicated pilot is used through a common control channel. The UE can know a resource region and a pilot pattern assigned to the UE through the dedicated control channel. The UE can estimate a channel by using the dedicated pilot and can detect the error from the data.

Upon detecting the error from the received data, the UE transmits a retransmission request signal (i.e., a negative acknowledgement (NACK) signal) to the BS (step S130).

Upon receiving the retransmission request signal from the UE, the BS transmits retransmission data (step S140). When the retransmission data is transmitted, a rank k modified from the rank n applied to the previously transmitted data is applied (where n is integer satisfying $n \geq k$). Data transfer efficiency can be increased by applying a low rank to the retransmission data. A pilot pattern may vary according to a rank.

Although downlink data transmission has been described above, the retransmission data can also be transmitted by decreasing the rank in uplink data transmission. The BS can assign a pilot pattern zone applied with a low rank to the UE through the dedicated control channel so that the UE can transmit uplink data with a low rank.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of transmitting data in a multiple antenna system, the method comprising:
  transmitting first data through a first pilot pattern zone in which pilots are arranged in a specific pilot pattern in a permutation zone having at least one tile comprising a plurality of orthogonal frequency division multiplexing (OFDM) symbols and a plurality of subcarriers; and
  transmitting second data through a second pilot pattern zone in which pilots are arranged in another pilot pattern different from the pilot pattern of the first pilot pattern zone in the permutation zone.

2. The method of claim 1, wherein the pilot patterns of the first pilot pattern zone and the second pilot pattern zone are determined according to the number of transmit antennas.

3. The method of claim 1, wherein the pilot patterns of the first pilot pattern zone and the second pilot pattern zone are determined according to a rank.

4. The method of claim 1, wherein the first pilot pattern zone and the second pilot pattern zone are divided in a time domain according to a time division multiplexing (TDM) scheme.

5. The method of claim 1, wherein the first pilot pattern zone and the second pilot pattern zone are divided in a frequency domain according to a frequency division multiplexing (FDM) scheme.

6. The method of claim 1, wherein the pilot of the first pilot pattern zone is a common pilot determined according to a cell, and the pilot of the second pilot pattern zone is a dedicated pilot for a specific user.

7. The method of claim 6, wherein the common pilot is assigned to a position adjusted according to a shift value depending on the cell, and the dedicated pilot is assigned to a fixed position.

8. The method of claim 1, wherein a pilot for distributed allocation in which subcarriers to be allocated to a user equipment are distributively mapped and a pilot for local allocation in which the subcarriers to be allocated to the user equipment are consecutively mapped are included in at least one of the first pilot pattern zone and the second pilot pattern zone.

9. The method of claim 8, wherein the pilot for the distributed allocation is assigned to a position adjusted according to a shift value, and the pilot for the local allocation is assigned to a fixed position.

10. The method of claim 1, wherein the pilots of the first pilot pattern zone and the second pilot pattern zone are dedicated pilots for a specific user.

11. The method of claim 10, wherein whether to use the dedicated pilot is indicated through a common control channel.

12. The method of claim 1, wherein information on the pilot pattern of the first pilot pattern zone or the second pilot pattern zone is indicated through a dedicated control channel.

13. The method of claim 1, wherein a basic unit of allocating a radio resource in the first pilot pattern zone is determined according to a range of a time domain or a frequency domain for the pilot pattern of the first pilot pattern.

* * * * *